United States Patent [19]

Rombi

[11] Patent Number: 4,879,117

[45] Date of Patent: Nov. 7, 1989

[54] INSECTICIDAL COLLAR AND PROCESS FOR PRODUCING IT

[76] Inventor: Max A. Rombi, 67, rue Rossini, 06000 Nice, France

[21] Appl. No.: 596,271

[22] Filed: Apr. 3, 1984

[30] Foreign Application Priority Data

Apr. 14, 1983 [FR] France ................... 83 06099
Nov. 29, 1983 [FR] France ................... 83 19005

[51] Int. Cl.⁴ ............................................ A01N 25/34
[52] U.S. Cl. .................................................... 424/411
[58] Field of Search ............... 424/28, 14, 16, 411; 119/106, 156

[56] References Cited

U.S. PATENT DOCUMENTS

| 2,791,202 | 5/1957 | Doyle | 424/28 |
| 3,904,746 | 9/1975 | Aries | 424/28 |
| 4,150,109 | 4/1979 | Dick et al. | 424/28 |
| 4,189,467 | 2/1980 | von Bittera et al. | 424/14 |
| 4,544,547 | 10/1985 | Van Bittera et al. | 424/28 |

OTHER PUBLICATIONS

Das. Controlled Release Technology Bioengineering Aspects.

Primary Examiner—Allen J. Robinson
Attorney, Agent, or Firm—Cushman, Darby & Cushman

[57] ABSTRACT

A ready for use insecticidal collar for animals, formed by a strip comprising an element containing an insecticidal substance and a casing which surrounds the element, wherein the element comprises a support material impregnated with the insecticidal substance in solution.

5 Claims, 4 Drawing Sheets

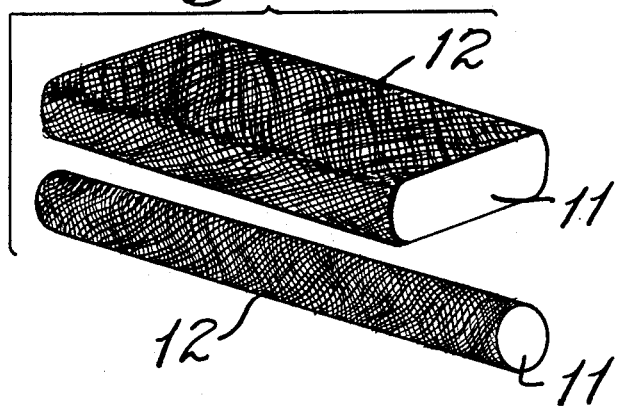
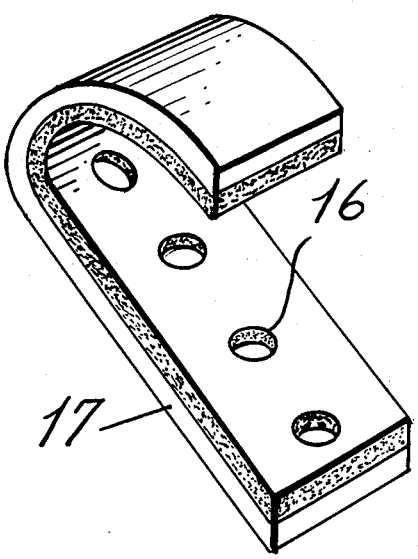
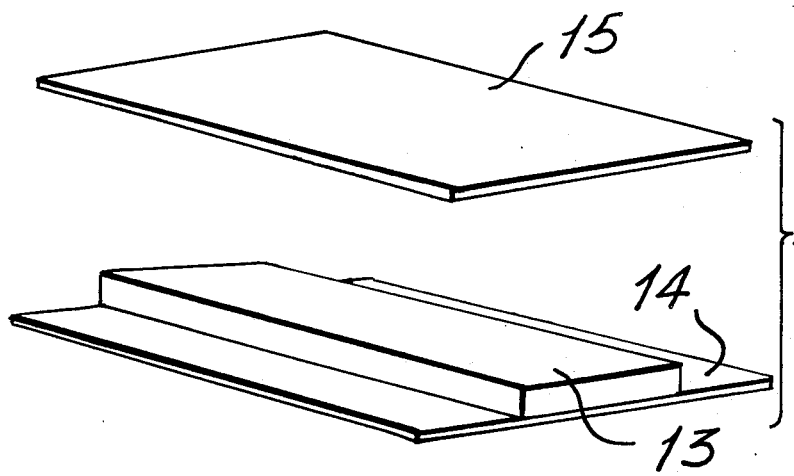
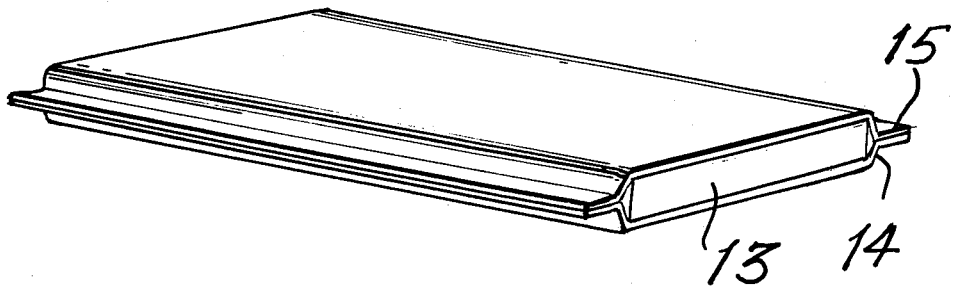

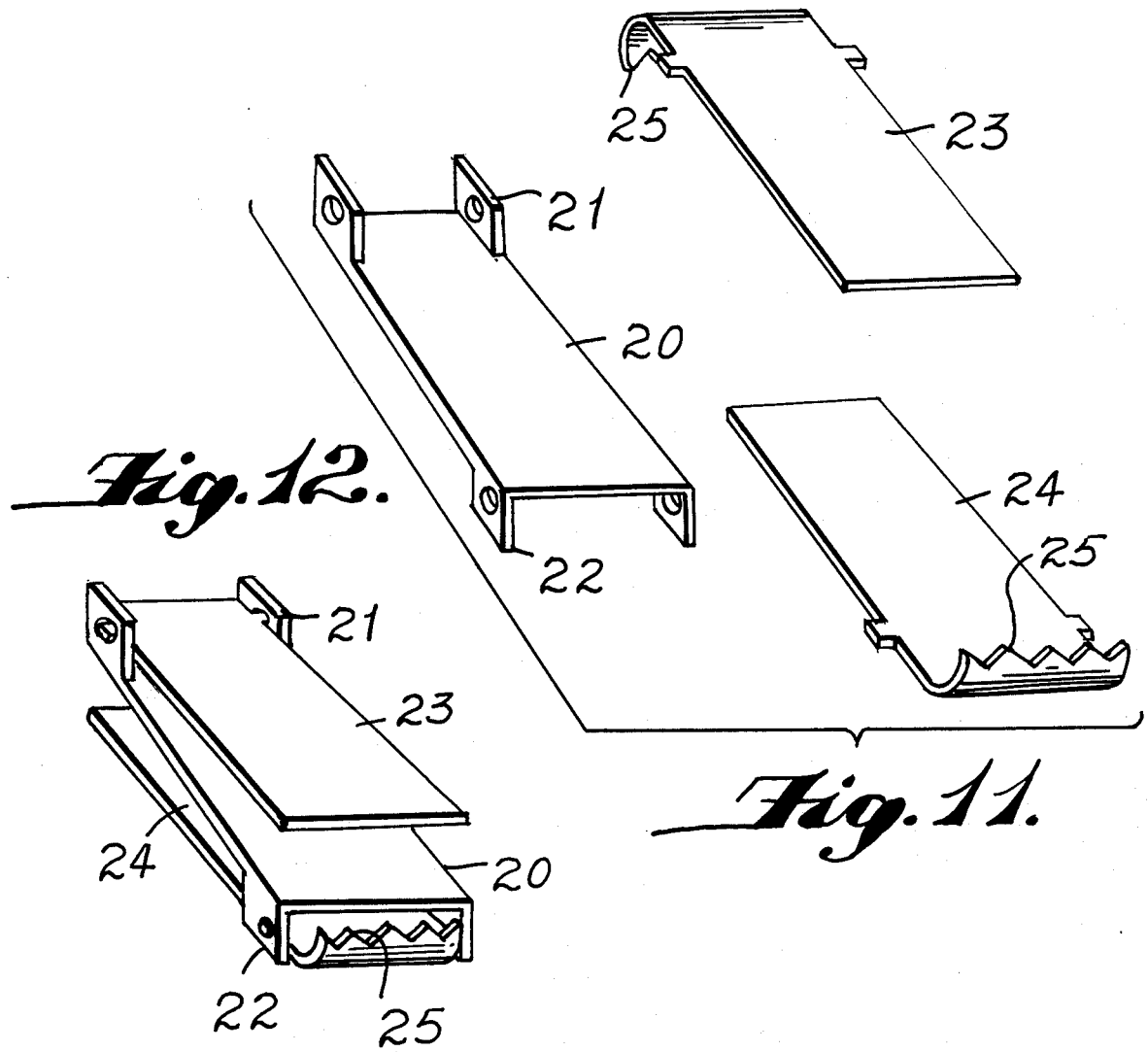
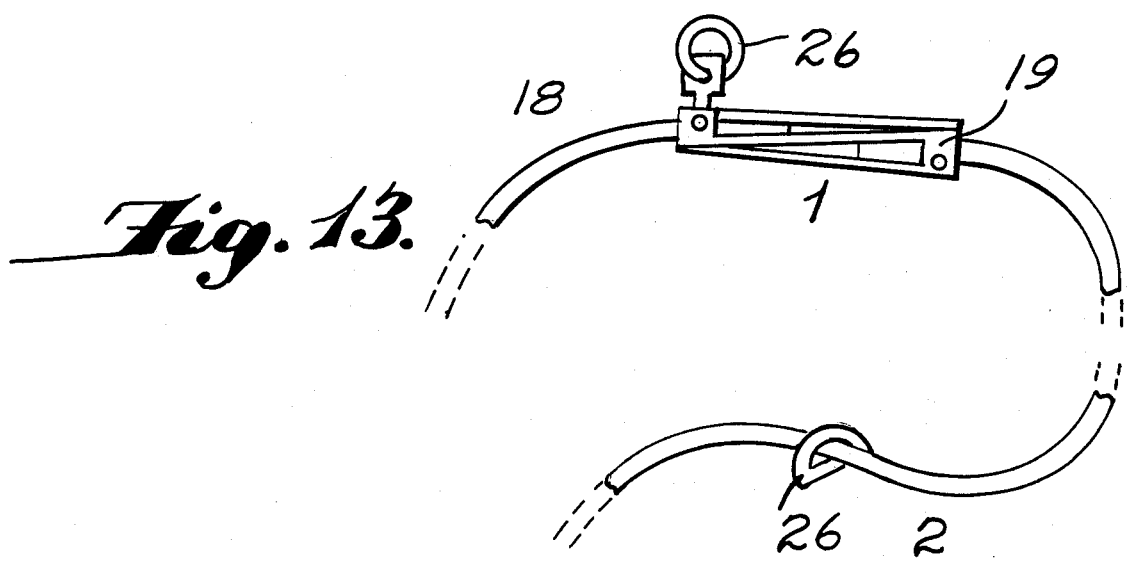

INSECTICIDAL COLLAR AND PROCESS FOR PRODUCING IT

This invention relates to insecticidal collars for animals.

Unlike other conventional insecticidal devices, an insecticidal collar for animals should have a certain degree of flexibility so that it can be buckled round the neck and should be made in the form of a thin strap. With the exception of the very early forms of insecticidal collars consisting of a conventional collar from which were suspended insecticidal vapour generators, or a leather harness containing solid insecticidal strips, with or without holes, insecticidal collars are formed of extruded thin straps of a composition containing the insecticidal substance and polyvinyl chloride, the insecticidal substance being incorporated in powdered polyvinyl chloride before extrusion.

Although easy to produce, economical and tried and tested technically, these strips nevertheless have disadvantages:

The production of these collars subjects them, at the extruder die, to a high temperature (100° to 200° C.) which destroys some of the insecticide, often causing disagreeable odours, particularly if the insecticide contains sulphur in its molecules. This problem may even be insurmountable in the case of molecules such as pyrethrins and pyrethroids, since they are largely destroyed at these temperatures. The migration of the insecticides may occur in several ways:

in the case of highly volatile insecticides, there is evaporation through the links of the polymer, which has the disadvantage of being highly sensitive to heat (which deprives the collar of some of its insecticidal content, thus greatly reducing its period of activity) and to humidity (which destroys the insecticide);

there may also be a molecule-by-molecule migration (not evaporation) of an oily liquid or a powder (non-volatile insecticides) through the polymer; this phenomenon has the opposite disadvantage to the preceding one, in that it causes a substantial part of the active substances to be trapped in the polymer (excessive thickness) and thus totally deactivates them (in any case, this always happens to some extent since every insecticide has a residual inactive proportion), which is a serious drawback in the case of products containing highly expensive pyrethroids.

These flexible collars, which are not very solid, cannot be used at all as strong collars and must always be accompanied by the collar required for restraining the animal by means of a leash or chain.

As they consist of strips of plastic which are brown, black, white or blue or even translucent, these collars are rather unattractive aesthetically.

The invention sets out to improve this type of insecticidal collar by eliminating the various problems mentioned above. In fact, the process for producing the collars according to the invention requires temperatures which are perfectly tolerated by the various insecticides used (generally ambient temperature). Moreover, the structure of the collars is such that a maximum amount of insecticide is released continuously and in infinitesimal amounts.

In fact, in the case of insecticides comparable with those of the invention (of extremely low volatility), a conventional collar releases its active substances by migration through the plastics, of which is it entirely made, thus resulting, as mentioned above, in the total inactivity of some of the insecticide, which is blocked by the excessive thickness of plastics which it has to pass through. These are generally active substances located towards the centre of the strip over its entire length; there is thus a nucleus of retention of insecticide.

The collar to which this invention relates does away with this disadvantage by its very design; it consists of two main parts: an internal support strip which can be compared with a sponge (since although it is extremely solid it absorbs a large quantity of liquid and can release it by simple pressure of the hand) and an outer casing of thin polymer.

Thus the advantage of the conventional collar is retained: the polymer acts as a diffuser of the insecticidal substance by migration through its links, whilst eliminating any risk of leaks. Moreover, the disadvantages, namely the retention of active substances, are done away with since the thickness of polymer to be passed through is slight compared with the conventional collar.

Furthermore, the strength of these collars enables them to be used, if necessary, as restraining collars and their appearance makes them genuine accessories for domestic animals.

The collar according to the invention is formed by a thin strip consisting of an element containing an insecticidal substance and a casing which surrounds the element. In the collar ready for use, the element consists of a support substance impregnated with the insecticidal substance in solution. Preferably, one side of the element is laid bare or is covered by part of the casing which is of a kind, structure and thickness such that the migration of the insecticidal substance out of the element and through this part of the casing is between 0.6 and 0.3 mg/day/cm$^2$ of surface of the strip.

As the introduction of the insecticidal substance no longer requires an extrusion process but is carried out by impregnation, for example at ambient temperature, there is no longer any danger of wastage and denaturing of the expensive insecticide as a result of subjection to high extrusion temperatures. Although the insecticidal substance is not very volatile, having a vapour pressure of the order of 1 millimeter of mercury at 200° C., for example, and of the order of $10^{-7}$ mm of mercury at 20° C., it nevertheless migrates through the casing which consists, particularly, of a polymeric substance, by molecule-by-molecule diffusion, whilst being invisible to the naked eye (although sometimes this migration can be observed in that it forms a very slightly oily skin ("microfilm") over the outer surface of the collars in the case of liquid insecticidal compositions.

There are a number of associated phenomena (artificial and natural) which cause the migration of the insecticidal solution:

internal pressures of various types: the collar itself, absorption of humidity from the air by hygroscopic products (to which the invention also relates), normal movement of the animal, wear of the outer casing by contact with the animal's coat, composition of the solution which contains a plasticiser for the polymer casing.

In fact, when the collar is in place around the dog's neck, it undergoes stresses caused by the normal movement of the animal which create internal pressures favouring the migration of the insecticidal substance through the polymer casing. This casing also undergoes continuous friction as a result of contact with the animal's coat, wearing out the surface of the casing which is in contact with the coat and also favourable to the emergence of the insecticidal substance. In order to facilitate this migration out of the impregnated material, through the polymer casing, it is also possible to add a hygroscopic product to the insecticidal impregnating substance, which by attracting humidity from the air through the casing will increase the internal pressure in the casing, making it easier for the insecticide to escape. Suitable hygroscopic substances used are mineral products such as calcium chloride and magnesium chloride and organic products such as lecithin, choline and the salts thereof. These organic substances are useful not only for their hygroscopic properties but also because by migrating with the insecticidal substance they turn out to be excellent softeners and protectors for the animal's skin precisely at the places where it is particularly prone to irritation caused by friction.

Generally, the hygroscopic substance constitutes from 1 to 10% by weight of the insecticidal substance. However, one of the most important characteristics of this collar, since it also facilitates the migration of the active substances, is that the insecticidal solution contains an excipient selected from among the plasticisers (or mixtures thereof) known for the various polymers which may constitute the outer casing. As plasticiser it is particularly possible to use adipates, citrates, phosphates, succinates and suberates. These plasticisers constitute from 5 to 95 parts by weight per 100 parts of the combined insecticidal substance and excipient.

These plasticisers, which are generally used to increase the flexibility of a polymer film (being added before polymerisation), here permit better diffusion of the active solution through the polymer casing. In fact, the chief property of a plasticiser stems from the fact that, when mixed with a monomer before polymerisation, it occupies the interstices between several links after cross-linking of the monomer: that is to say that the larger the quantity of plasticiser introduced, the larger and consequently looser the link, hence the greater flexibility of the plasticised polymer.

A similar phenomenon is observed in the collar where the plasticiser enlarges the links of the polymer casing whilst diffusing from the inside (support substance) to the outside of the collar, thus permitting an increase in the diffusion of the other products (active substances) out of the collar and on to the animal's coat.

Once having left the collar through the polymer casing, these insecticidal solutions impregnate the animal's fur starting from the neck and thus gradually cover the entire coat. Since the products of which they are composed are selected for their insolubility in water, the treated animal is thus permanently covered with a veritable "insecticidal screen" throughout the service life of the collar.

It is this which makes the difference between this collar and the insect eliminating systems such as insecticidal plates which act in a vapour phase by means of insecticides which are highly volatile but extremely sensitive to heat and humidity (reduction of the period of activity by evaporation or destruction of the active principle).

Examples of support materials which can be used as a substrate and reservoir for the insecticidal active substances in solution include leather, textile materials such as wool, felt, bonded cellulose, non-woven and woven materials, polymer foams, cardboard, cotton, and, in general terms, any substance which is sufficiently porous to be impregnated (generally, the porosity is greater than 0.20 g per centimeter for a strip 1.5 cm wide and 2 mm thick. The table for impregnation levels is given hereinafter). Although it is also possible to use inert powdered carriers such as talc, silica, alumina, clay, chalk, sulphur, lime, carbon, powdered plant material, etc., it is greatly preferable to use textile materials, in particular, which not only have the excellent flexibility required for a constituent part of a collar but also a sufficient tear strength of at least 60 kg in a test in which, in the form of a strip 1.5 cm wide and 2 mm thick, it is subjected to pulling. Generally, textile materials with a tear strength of at least 80 kg or more are preferred, these values being obtained longitudinally and transversely on test pieces as mentioned above. Consequently, the collar for the insecticide can also be used as a restraining collar, whereas extruded collars known hitherto were not sufficiently strong to be used for this purpose.

It is also possible to fix or mark some form of identification or stick-on decoration to the casing of the collar which is not in contact with the animal's neck by any suitable means.

Example of the polymers which form the casing of the collar, either by coating beforehand or by addition after impregnation of the porous material, include polyvinyl halides, particularly polyvinyl chloride, polyurethanes, butadiene, divinylbenzene and styrene polymers, polyvinyl acetals, polyvinylidene compounds, substances of the cellophane type, polymers of ethylene and propylene and copolymers of these two products, polyacrylates, polymers and copolymers of methyl acrylate, ethyl acrylate, methyl and ethyl methacrylate, polyesters, cellulose plastics and natural elastomers such as rubber.

The desired results are obtained when the thickness of the outer casing is less than about 1 mm and preferably between 0.1 and 0.8 mm.

Although it is particularly preferred to use bonded cellulose as the support material, polyvinyl chloride is the preferred polymer for the casing.

Table I which follows gives the permeability figures for the polymers which are most frequently used and best known relative to a number of substances.

It should also be noted that certain researchers have shown that if a comparison is made between the permeability of an organic product (or a mixture of organic products) in liquid phase and in vapour phase (saturating) through a plastics film, in the majority of cases higher figures are obtained when the film is in contact with the liquid mixture than when it is subjected only to the action of vapour; this has an advantage for this collar since the insecticidal compositions which it contains are liquid and not very volatile.

TABLE 1

| Polymer | Polyvinyl Chloride | Polyethylene | Nylon/rilsan Polyamides |
|---|---|---|---|
| Permeability relative to | | | |

TABLE 1-continued

| | | | |
|---|---|---|---|
| Water* | 32 | 28 | 200/31 |
| Nitrogen** | 1.6 | 20 | 0.2/0.42 |
| Oxygen** | 4 | 55 | 0.32/1.6 |
| Carbon dioxide** | 32 | 265 | 1.6/11 |
| Hexane*** | 4.2 | | 5/ |
| Heptane*** | | 4600 | |
| Benzene*** | | 7700 | |
| Toluene*** | | | 8.8/ |
| Carbon tetrachloride*** | | 9500 | 8.5/ |
| Methanol*** | 21 | 20 | 590/ |
| Ethanol*** | | | |
| Ethyl acetate*** | | 650 | 1.1/ |
| Acetone*** | | 300 | |
| Methylethylketone*** | | | 1.4/ |
| Acetic acid*** | | 58 | |
| Dibutyl ether*** | | 1500 | 2,3/ |

| Polymer | Cellophanes | Polystyrene | Polypropylene | Cellulose Acetates | Polyesters |
|---|---|---|---|---|---|
| Permeability relative to | | | | | |
| Water* | 1870 | 133 | 9 | 160 | 30 |
| Nitrogen** | | 3 to 80 | 4.4 | 1.6 | 0.05 |
| Oxygen** | 0.05 to 0.2 | 15 to 250 | 23 | 4 | 0.03 |
| Carbon dioxide** | 0.25 | 75 to 370 | 92 | 32 | 1 |
| Hexane*** | 8.4 | | | | |
| Heptane*** | | | | | |
| Benzene*** | 6.5 | | | | |
| Toluene*** | | | | | |
| Carbon tetrachloride*** | 9.4 | | | | |
| Methanol*** | | | | | |
| Ethanol*** | 870 | | | | |
| Ethyl acetate*** | 6.2 | | | | |
| Acetone*** | 580 | | | | |
| Methylethylketone*** | | | | | |
| Acetic acid | 590 | | | | |
| Dibutyl ether*** | | | | | |

*g/m$^2$ .24 hours, for a thickness of 25 μm at ambient temperature under atmospheric pressure.
**cm$^3$ .10$^{10}$/cm$^2$ .s.cm Hg of gas pressure for a thickness of 1 mm at ambient temperature.
***g/0.025 mm/24 hours/m$^{2\cdot}$ The insecticidal substances are preferably pyrethroids, particularly the following:

| | | |
|---|---|---|
| Allethrin | = | 2-methyl-4-oxo-3-(2-propenyl)-2-cyclopenten-1-yl 2,2-dimethyl-3-(2-methyl-1-propenyl)-cyclopropane carboxylate. |
| Barthrin | = | (6-chloro-1,3-benzodioxol-5-yl)methyl 2,2-dimethyl-3-(2-methyl-1-propenyl)-cyclopropane carboxylate. |
| Bioresmethrin | = | [5-phenyl-methyl)-3-furanyl]] methyl 2,2-3-(2-methyl-1-propenyl) carboxylate. |
| Bromethrin | = | (5-benzyl-3-furyl)methyl 2-(2,2-dibromovinyl)-3,3-dimethylcyclo-propane carboxylate. |
| Cyclethrin | = | 3-(2-cyclopenten-1-yl)-2-methyl-4-oxo-2-cyclopenten-1-yl 2,2-dimethyl-3-(2-methyl-propenyl)-cyclopropane carboxylate. |
| Dimethrin | = | 2,4-dimethylbenzyl 2,2,3-(2-methyl-1-propenyl) carboxylate. |
| Pyresmethrin | = | 3-[(5-benzyl-3-furyl)-methyl]methyl trans (+)-3-carboxy-α,2,2-trimethyl-cyclopropane acrylate. |
| Resmethrin | = | (5-benzyl-3-furyl)methyl 2,2,3-(2-methyl-1-propenyl) carboxylate. |
| Tetramethrin | = | (1,3,4,5,6,7-hexahydro-1,3- di-oxo-2-2H—isoindol-2-yl)methyl 2,2,3-(2-methyl-1-propenyl) carboxylate. |
| K—othrin | = | (5-benzyl-3-furyl)-methyl- |

-continued

| | | |
|---|---|---|
| | | trans-(+)-3-cyclopentylidene-methyl 2,2-dimethylcyclopropane carboxylate. |
| Permethrin NRDC 143 | = | m-phenoxybenzyl cis-trans-(±)-(FMC 33297)3-(2,2-dichlorovinyl) 2,2-dimethyl cyclopropane carboxylate. |
| Cinerin I | = | 2-(2-butenyl)-4-hydroxy-3-methyl-2-cyclopenten-1-one 2,2,3-(2-methyl-1-propenyl) carboxylate. |
| Pyrethrin I | = | 4-hydroxy-3-methyl-2-(2,4-pentadi-enyl)-2-cyclopenten-1-one 2,2,3-(2-methyl-1-propenyl) carboxylate. |
| Cinerin II | = | 2-(2-butenyl)-4-hydroxy-3-methyl-2-cyclopenten-1-one 2,2,3-(2-methyl-1-propenyl) carboxylate. |
| Pyrethrin II | = | 4-hydroxy-3-methyl-2-(2,4-pentadienyl)-2-cyclopenten-1-one 2,2,3-(2-methyl-1-propenyl) carboxylate. |
| Jasmolin I | = | 4',5'-dihydropyrethrin-I. |
| Jasmolin II | = | 4',5'-dihydropyrethrin-II. |
| Biothanometrin | = | (5-benzyl-3-furyl)methyl 2,2-dimethyl 3-(2-cyclopentylvinyl)-cyclopropane carboxylate. |
| Bioethanometrhin | = | (3-diphenyl-ether)methyl 2-(2,2-dichlorovinyl)-3,3-dimethyl-cyclopropane carboxylate. |
| Cypermethrin | = | (3-diphenyl-ether)cyanomethyl 2-(2,2-dichlorovinyl)-3,3-dimethyl-cyclopropane |

| | -continued | | | -continued |
|---|---|---|---|---|
| Decamethrin | = (3-diphenylether)cyanomethyl 2-(2,2-dibromovinyl)-3,3-dimethyl cyclopropane carboxylate. | | Mexacarbate | oxyl]-ethanimidothioate.<br>= 4-dimethylamino-3,5-dimethylphenyl methylcarbamate. |
| ES-56 | = 2,3-dihydrofuran 2,2,3-(2-methyl-1-propenyl) carboxylate. | | Nabam<br>Nitrilacarb | = disodium 1,2-ethanediyl-bis (carbamodithioate).<br>= zinc chloride of (4,4-dimethyl-5-methylaminocarbonyloxy-imino)pentane-nitrile. |
| Fenpropanate (S-3206) | = (-3-diphenylether)cyanomethyl 2,2-dimethyl-3,3-dimethyl-cyclopropane carboxylate. | | Oxamil | = methyl-2-(dimethylamino)-N—[[(methyl-amino)carbonyl]oxy] 2-oxoethaniminothioate. |
| Fenvalerate (S-5602) | = (-3-diphenylether)cyanomethyl [(p-chlorophenyl)(isopropyl)] acetate. | | Pirimicarb | = 2-(dimethylamino)-5,6-dimethyl-4-pyrimidinyl dimethylcarbamate. |
| S-5439 | = (3-diphenylether)methyl [(p-chlorophenyl)(isopropyl)] acetate. | | Promecarb | = 3-methyl-5-(1-methylethyl)phenyl methylcarbamate. |
| Cis-methrin | = 5-benzyl-3-furylmethyl 2,2,3-(2-methyl-1-propenyl) carboxylate. | | Propoxur<br>Thiofanox | = 2-(1-methylethoxy)-phenyl methylcarbamate.<br>= 3,3-dimethyl-(methylthio)-2-butanone-O—[(methylamino)carbonyl]-oxime. |
| Phenothrin | = (3-phenoxybenzyl)methyl 2,2,3-(2-methyl-1-propenyl) carboxylate. | | Thiocarboxime | = 1-(2-cyanoethylthio) ethylidene aminomethyl carbamate. |

Deltamethrin, cyanohydrin, cyanophenotrin, furethrin, bioallethrin, furamethrin, kadethrin.
It is also possible to use carbamates:

Thiram = tetramethylthioperoxydicarbonic acid diamide.
Trimethylphenyl- 3,-4,-5-trimethylphenyl-
methylcarbamate = methyl carbamate.
3,4-xylylmethylcarbamate = 3,4-dimethylphenylmethyl-carbamate.
3,5-xylylmethylcarbamate = 3,5-dimethylphenylmethyl-carbamtte.

| Aldicarb | = 2-methyl-2-(methylthio)-propanal-O—[(methyl-amino)carbonyl)] oxime. |
|---|---|
| Aldoxycarb | = 2-methyl-2-(methylsulfonyl)propanal-O—[(methylamino)carbonyl]oxime. |
| Allyxycarb | |
| Aminocarb | = 4-dimethylamino-3-methylphenyl methylcarbamate. |
| Bendiocarb | = 2,2-dimethyl-benzo-1,3-dioxol-4-yl N—methylcarbamate. |
| Bufencarb | = Mixture of 3-(1-methyl-butyl)phenyl methyl carbamate and 3-(1-ethylpropyl)phenyl methyl carbamate (3:1). |
| Butacarb | = 3,5-bis (1,1-dimethyl-ethyl)phenyl) methylcarbamate. |
| Butocarboxim | = 3-methylthio-2-butane-O—[(methylamino)carbonyl]oxime. |
| Butoxycarboxim | = 3-methylsulfonyl-2-butanone-O—[(methylamino)carbonyl]oxime. |
| 2-sec-butylphenyl methylcarbamate. | = 2-(1-methylpropyl)phenyl methyl- |
| Carbanolate | = 2-chloro-4,5-di-methylphenyl methylcarbamate. |
| Carbaryl | = 1-naphthalenyl methylcarbamate. |
| Carbofuran | = 2,3-dihydro-2,2-dimethyl-7-benzofuranyl methylcarbamate. |
| Cartap | = S,S'—[2-(dimethyl-amino)-1-3-propane di-yl]carbamo-thioate. |
| Decarbofuran | = 2,3-dihydro-2-methylbenzofuran-7-yl methylcarbamate. |
| Dimetilan | = -[(dimethylamino)-carbonyl]-5-methyl-1H—pyrazol-3-yl dimethylcarbamate. |
| Dioxacarb | = 2-(1,3-dioxolan-2-yl)phenyl methylcarbamate. |
| Ethiofencarb | = 2-ethylthiomethyl-phenyl methylcarbamate. |
| Fenethacarb | = 3,5-diethylphenyl methyl-carbamate. |
| Formetanate | = 3-dimethylaminomethylene-aminophenyl methylcarbamate. |
| Formparanate | = 3-methyl-4-dimethyl-amino-methyleneaminophenyl methylcarbamate. |
| Isoprocarb | = 2-isopropylphenyl methyl-carbamate. |
| Methiocarb | = 3,5-dimethyl-4-methylthiophenyl methylcarbamate. |
| Methomyl | = methyl-N—[[(methylamino)carbonyl]- |

| Zineb | = Zinc[[1,2-ethanediylbis(carbamo-dithioato)](2-)]. |
|---|---|
| Ziram | = Zinc bis(dimethylcarbamodi-thioato-S,S'). |

It is also possible to use organophosphorus compounds such as the following:

| Acephate | = O,S—dimethylacetylphosphoroamino-thioate. |
|---|---|
| Amidithion | = S—(N—2-methoxyethylcarbamoyl-methyl)-dimethylphosphorodithioate. |
| Amiton | = S—[2-(diethylamino)ethyl]diethyl-phosphorothioate. |
| Athidation | = O,O—diethyl S—5-methoxy-2-oxo-1,3,4-thiadiazol-3-yl-methylphosphorodithioate. |
| Azinphos-ethyl | = O,O—diethyl S—[(4-oxo-1,2,3-benzotriazine-3(4H)-yl)methyl]-phosphorodithioate. |
| Azinphos-methyl | = O,O-dimethyl-S—[(4-oxo-1,2,3-benzotriazine 3(4H)yl)-methyl]phosphorodithioate. |
| Azothoate | = O,O—dimethyl-O—[p—(p—chlorophenylazo)-phenyl]phosphoro-thioate. |
| Bromophos | = O—(4-bromo-2,5-dichlorophenyl)-O,O—dimethylphosphorothioate. |
| Bromophos-ethyl | = O—(4-bromo-2,5-dichlorophenyl)-O,O—diethylphosphorothioate. |
| Butonate | = O,O—dimethyl-1-butyryl 1-butyryloxy- |
| Carbophenothion | = S[[(4-chlorophenyl)thio]methyl] O,O—diethylphosphorodithioate. |
| Chlorfenvinphos | = diethyl 2-chloro-1-(2,4-dichlorophenyl)-ethenyl phosphate. |
| Chlormephos | = S—chloromethyl-O,O—diethylphos-phorodithionate. |
| Chlorphoxim | = 7-(2-chlorophenyl)-4- |

| | | |
|---|---|---|
| | | ethoxy-3,5-dioxa-6-aza-4-phosphaoct-6-ene-8-nitrile-4-sulfide. |
| Chlorprazophos | = | O,O—diethyl-O—3-chloro-7-methylpyrazolo[1,5a]pyrimidin-2-yl-phosphorothioate. |
| Chlorpyrifos | = | O,O—diethyl-0-3,5,6-trichloro-2-pyridylphosphorothioate. |
| Chlorpyridos-methyl | = | O,O—dimethyl O—3,5,6-trichloro-2-pyridylphosphorothioate. |
| Chlorthiophos | = | O—2,5-dichloro-4-(methylthio)-phenyl O,O—diethylphosphorothioate. |
| Coumaphos | = | O—3-chloro-4-methylcouramin-7-yl O,O—diethylphosphorothioate. |
| Coumithoate | = | O,O—diethyl O—(7,8,9,10-tetrahydro-6-oxo-6H—dibenzo[b,d]-pyran-3-yl-phosphorothioate. |
| Crotoxyphos | = | 1-phenylethyl(E)-3-[(dimethoxy phosphinyl)-oxy]-2-butenoate. |
| Cruformate | = | 2-chloro-4-(1,1-dimethylethyl)-phenylmethylmethylphosphoramidate. |
| Cyanofenphos | = | O-4-cyanophenyl —ethylphenyl-phosphonothioate. |
| Cyanophos | = | O—4-cyanophenyl O,O—dimethyl phosphorothioate. |
| Cyanthoate | = | O,O—diethyl S[N-(1-cyano-1-methylethyl)-carbamoylmethyl-phosphorothioate. |
| Demephion | = | Mixture of O,O—dimethyl O—2-methylthioethylphosphoro-thioate and O,O—dimethyl-S-2-methylthioethylphosphorothioate. |
| Demeton | = | Mixture of O,O—diethyl O—2-ethylthioethylphosphoro-thioate and O,O—diethyl S—2-ethylthioethylphosphoro-thioate. |
| Demeton-S—methyl | = | O,O—dimethyl-S—2-ethylthioethyl-phosphorothioate. |
| Demeton-S—methyl sulfone | = | S—2-ethylsulfonylethyl-O,O—dimethylphosphorothioate. |
| Demeton-S | = | O,O—diethyl S—[2-(ethylthio)-ethyl]-phosphorothioate. |
| Demeton-O | = | O,O—diethyl O—[2-ethylthio)-ethyl]-phosphorothioate |
| Demeton-O—methyl | = | O,O—dimethyl O—[2-(ethylthio)-ethyl]-phosphorothioate. |
| Dialifos | = | S—[2-chloro-1-(1,3-dihydro 1,3-dioxy-2H-isoindol-2-yl)ethyl]O,O—diethyl-phosphorodithioate. |
| Diazinon | = | O,O—diethyl O—[6-methyl-2-(1-methyl-ethyl)-4-pyrimidinyl]phosphorothioate. |
| Dichlorfenthion | = | O,O—diethyl O—(2,4-dichloro-phenyl)-phosphorothionitrate. |
| O-2,4-dichlorophenyl-O-ethylphenylphosphonothioate. | | |
| Dichlorvos | = | dimethyl 2,2-dichloroethenyl phosphate. |
| Dicrotophos | | dimethyl 3-(dimethylamino)-1-methyl-3-oxo-1-propenylphosphate. |
| Dimefox | | bis(dimethylamino)fluorophosphine oxide. |
| Dimethoate | | O,O—dimethyl-S—[2-(methylamino)-2-oxo-ethyl]phosphorodithioate. |
| 1,3-di-(methoxycarbonyl)-1-propen-2-yl-dimethyl-phosphate = dimethyl 3-[(dimethoxyphosphinyl)oxy]--pentenedioate. | | |
| Dimethyl-4-(methylthio)phenyl phosphate. | | |
| Dioxathion | = | S,S'-1,4-dioxane-2,3-diyl-O,O',O'—tetraethyl di(phosphorodithioate). |
| Disulfoton | = | O,O—diethyl-S-2-ethylthioethyl-phosphorodithioate. |
| EPN | = | O—ethyl O—4-nitrophenyl phenylphosphonothioate. |
| Endothion | = | O,O—dimethyl S—(5-methoxy-4-pyron-2-yl-methyl)phosphorothoate. |
| Ethion | = | O,O,O',O'—tetraethyl-S,S'—methylene di(phosphorodithioate). |
| S-ethylsulfinylmethyl O,O—diisopropylphosphorodithioate. | | |
| Ethoate-methyl | = | O,O—dimethyl-S—(N—ethylcarbamoyl-methyl)phosphorodithioate. |
| Ethoprophos | = | O—ethyl-S,S—dipropylphosphorodithioate |
| Etrimfos | = | O—(6-ethoxy-2-ethyl-4-pyrimidinyl)-O,O—dimethylphosphorothioate. |
| Famphur | = | O,O—dimethyl O—p—(dimethyl-sulfamoyl)- phenylphosphorothioate. |
| Fenchlorphos | = | O,O—dimethyl O—(2,4,5-trichlorophenyl)phosphorothioate. |
| Fensulfothion | = | O,O—diethyl O—4-(methylsulfinyl)-phenylphosphorothioate. |
| Fenthion | = | O,O—dimethyl —[3 methyl-4-(methylthio)-phenyl]phosphoro-thioate. |
| Fonofos | = | O—ethyl S—phenylethylphosphono-dithioate |
| Formothion | = | S—[2-(formylmethylamino)-2-oxoethyl]O,O—dimethyl-phosphorodithioate. |
| Fospirate | = | Dimethyl 3,5,6-trichloro-2-pyridyl-phosphate. |
| Fosthietan | = | diethyl 1,3-dithietan-2-yl-idenephosphoramidate. |
| Heptenophos | = | 7-chlorobicyclo[3,2,0]-hepta-2,6-dien-6 yldimethyl-phosphate. |
| Iodofenphos | = | 0-2,5-dichloro-4-iodophenyl-O,O—dimethylphosphorothioate. |
| Isofenphos | = | 1-methylethyl 2-[[ethoxy]) 1-methylethyl]amino]phosphino-thioyl]oxy]benzoate. |
| Leptophos | | O—4-bromo-2,5-dichlorophenyle O—methylphenylphosphonothioate. |
| Lythidathion | = | O,O—dimethyl-S—(5 ethoxy-2,3-dihydro-2-oxo-1,3,4 thiadiazol-3-ylmethyl)phos-photodithioate. |
| Malathion | = | diethyl(dimethoxyphosphinothioyl)-thio-butanedioate. |
| Mazidox | = | N,N,N',N'—tetramethylphosphoro-diamidic acid. |
| Mecarbam | = | methyl ethyl[[(diethoxyphosphino-thioyl)thio]acetyl]carbamate. |
| Mecarphon | = | N—methylcarbonyl-N—methyl-carbamoylmethyl O—methylmethyl-phosphonodithioate. |
| Menazon | = | S—[(4,6-diamino-1,3,5-triazin-2-yl)-methyl]O,O—dimethylphosphorodithioate. |
| Mephosfolan | = | diethyl-4-methyl-1,3-dithiolan-2-yl-dinenephosphoramidate. |
| Methamidophos | | O,S—dimethylphosphoramdthioate. |
| Methidation | = | S—[[5-methoxy 2-oxo-1,3,4-thiadiazol-3(2H)-yl]methyl] O,O—dimethylphosphorodiothioate. |
| Methocrotophos | | dimethyl cis-2-(N—methoxy-N—methyl-carbamoyl)-1-methylvinylphosphate. |
| 2-methoxy-4H-benzo-1,3,2-dioxaphosphorine disulfide. | | |
| Methyl carbophenotion | = | S—[[(4-chlorophenyl)thio]-methyl]O,O—dimethylphosphoro-dithioate. |
| Mevinphos | | methyl-3-[(dimethoxyphosphinyl)-oxy]-2-butenoate. |
| Monocrotophos | = | dimethyl-1 methyl-3-(methyl amino)-3-oxo-1-propenylphosphate. |
| Morphotion | = | O,O—dimethyl S—(morpholino carbonylmethyl)phosphoro-dithioate. |
| Naled | | dimethyl 1,2-dibromo-2,2-dichloroethylphosphate. |
| Omethoat | = | O,O—dimethyl-S—[2-(methylamino)-2-oxo-ethyl]phosphorothioate |
| Oxydemeton-methyl | = | S—[2-(ethylsulfinyl)ethyl]O,O—dimethylphosphorothioate. |

| | | |
|---|---|---|
| -continued | | |
| Oxydisulfoton | = | O,O—diethyl S—[2-(ethyl-sulfinyl)-ethyl]phosphoro-dithioate. |
| Parathion | = | O,O—diethyl O—4-nitrophenyl-phosphorothioate. |
| Parathion-methyl | = | O,O—dimethyl O—4-nitrophenyl-phosphorothioate. |
| Phenkapton | = | O,O—diethyl S—(2,5-dichloro-phenylthiomethyl)phosphorodithioate. |
| Phenthoate | = | ethyl α[(dimethoxyphosphino thioyl)thio]-benzeneacetate. |
| Phorate | = | O,O—diethyl S—ethylthiomethyl-phosphorodithioate. |
| Phosalone | = | S—[(6-chloro-2-oxo-3)(2H)-benzoxazolyl](methyl)] O,O—diethylphosphorodithioate. |
| Phosfolan | = | diethyl 1,3-dithiolan-2-ylidene-phosphoramidate. |
| Phosmet | = | S—[(1,3-dihydro-1,3-dioxo-2H-isoindo--2-yl)methyl]O,O—dimethylphosphoridithioate. |
| Phosnichlor | = | O,O—dimethyl-O—4-chloro-3-nitrophenyl-phosphorothioate. |
| Phosphamidon | = | dimethyl 2-chloro-3-(diethyl-amino)-1-methyl-3-oxo-1-propenylphosphate. |
| Phoxim | = | α-[[(diethoxyphosphinothioyl)oxy]imino]-benzene acetonitrile. |
| Pirimiphos ethyl | = | O—[2-(diethylamino)-6-methyl-4-pyrimidinyl)]O,O—diethylphosphorothioate. |
| Pirimiphos methyl | = | O—[2-(diethylamino)-6-methyl-4-pirimidinyl)]O,O—dimethylphosphorothioate. |
| Profenofos | = | O—(4-bromo-2-chlorophenyl) O—ethyl-S—propylphosphorothioate. |
| Propetamphos | = | (E)-1-methylethyl 3-[[(ethyl-amino)methoxyphosphinothioyl]oxy]-2-butenoate. |
| Prothidathion | = | O,O—diethyl-S—(2,3-dihydro-5-isopropyl-2-oxo-1,3,4-thiadiazol-3-ylmethyl) phosphorodithioate. |
| Prothoate | = | O,O—diethyl S—[2-(1-methyl-ethyl)amino-2-oxoethyl]phosphorodithioate |
| Quinalphos | = | O,O—diethyl O-2-quinoxalinyl-phosphoro-thioate. |
| Quinothion | = | O,O—diethyl-2-methylquinolin-4-yl-phosphorothioate. |
| Quintiofos | = | O—ethyl-0-8-quinolylphenyl-phosphorothioate. |
| Schradan | = | octamethyldiphosphoramide. |
| Sophamide | = | O,O—dimethyl S—N—methoxy-methyl)-carbamoylmethylphosphoro-dithioate. |
| Sulfotepp | = | tetraethyl thiodiphosphate. |
| Sulprofos | = | O—ethyl O—(4-methylthiophenyl)-2-propylphosphorodithioate. |
| Temephos | = | O,O'—(thiodi-4,1 phenylene) O,O,O',O'—tetramethyl di(phosphorothioate). |
| Tepp | = | tetraethyl diphosphate. |
| Terbufos | = | S—[[(1,1-dimethylethyl)]thio methyl]-O,O—diethylphosphoro-dithioate. |
| Tetrachlorvinphos trichlorophenyl) vinyl phosphate | = | dimethyl trans-2-chloro-1-(2,4,5- |
| O,O,O',O'—tetrapropyl dithiopyrophosphate | = | tetrapropyl-thiodiphosphate. |
| Thiometon | = | O,O—dimethyl S—[2-(ethylthio)-ethyl]phosphorodithioate. |
| Thionazin | = | O,O—diethyl O—pyrazinylphos-phorothioate. |
| Triazophos | = | O,O—diethyl O—(phenyl-1H-1,2,4-triazol-3-yl)phosphoro-thioate. |
| Trichloronate | = | O—ethyl O-2,4,5-trichlorophenyl-ethylphosphonothioate. |
| Trichlorophon | = | dimethyl (1-hydroxy-2,2,2-trichloroethyl)phosphonate. |

| | | |
|---|---|---|
| -continued | | |
| Vamidothion | = | O,O—dimethyl S—[2-(1-methylcarbamoylethyleneethyl]-phosphorothioate. |

Preferably, the solution of insecticidal substance has a synergistic agent added to it, namely a product which is non-toxic or which is only slightly toxic at the doses at which it is used, but which serves to increase the toxicity of the insecticide when it is combined with it. It is pyrethroid insecticides, in particular, to which synergists are added, such as

| | | |
|---|---|---|
| Sesamin | = | 5,5'(tetrahydro-1H,3H—furo[3,4-C]-furan-1,4-diyl)bis-1,3-benzodioxole. |
| Sesamolin | = | 5-[4-(1,3benzodiaxolol-5-yloxy)tetrahydro-1H,3H—furo[3,4-C]-furan-1-yl]-1,3-benzodioxole. |
| Piperonyl butoxide | = | 5-[[2-(2-butoxyethoxy)ethoxy] methyl]-6-propyl-1,3-benzodioxole. |
| Sesamex | = | 5-[1-[2-(2-ethoxyethoxy)ethoxy]-1,3-benzodioxole. |
| Sulfoxide | = | 5-[2-(octylsulfinyl)propyl]-1,3-benzodioxole. |
| MGK 264 | = | N,octylbicycloheptenedicarboximide. |
| S 421 | = | octachlorodipropyl ether. |

Apart from the insecticides listed above, it it also possible to use growth regulators which are juvenile hormones, either on their own or in formulations in which they appear with one or more comigrants, or in conjunction with one or more other insecticides and synergists. The growth regulators interrupt the development of animal parasites, which never reach their adult stage. Thus, they are prevented from reproducing and condemned to die in the larval stage without ever being able to cause an infestation in the dog or cat treated. These growth regulators include, in particular, methoprene: isopropyl (2E,4E)-11-methoxy-3,7,11-trimethyl-2,4-dodecadienoate, hydroprene: ethyl 3,7-11-trimethyldodeca-2,4-dienoate, triprene: S-ethyl-(E,E)-11-methoxy-3,7,11-trimethyl-2,4-dodecadienethi-oate, diflubenzuron: N-[[(4-chlorophenyl)amino]-carbonyl]-2,6-difluorobenzamide.

Preferably, these growth regulators, like the other insecticidal substances, represent from 0.1 to 0.5% of the weight of the collar.

The insecticidal substances may be combined with co-evaporants, such as alcohols, ketones, light esters, benzene, glycols, or heavy esters such as maleates, sebacates, laurates, fumarates, phthalates (the majority of these heavy esters being plasticisers for the polymers selected), or heavy hydrocarbons such as vaseline oil, and paraffins and various vegetable and animal oils such as soya oil, groundnut oil and corn oil. The liquid insecticidal substance used for impregnation may also have emulsifiers, stabilisers and perfumes added to it.

The invention also relates to a process for producing an insecticidal collar which consists in impregnating a support material with the liquid insecticidal substance and surrounding the support material which has been impregnated with the liquid insecticidal substance with a casing of a type and thickness such that the migration of liquid insecticidal substance through the casing is between 0.6 and 0.3 mg/day/cm$^2$ of surface of the strap.

According to a first embodiment, the support material is a porous or fibrous material which is circular, elliptical, semi-circular, lenticular or rectangular in cross section, which is coated with a fine film of polymer intended to be dried or baked, particularly polyvinyl chloride or polyurethane, over its entire surface, with the exception of its base which is intended to form the inner part of the collar which comes into contact with the animal's coat. The strip is impregnated, through the non-coated surface, with a solution or an insecticidal gel until the porous material is saturated. According to another embodiment, the free base of the polymeric coating is coated with a layer of adhesive and the two identical elements prepared as above are stuck together, by their glued surfaces, so as to obtain a collar all the surfaces of which are covered with a shell of polymer.

According to another embodiment, a strip with a free surface, as prepared above, is sewed to another strip of the same type so as to obtain the collar. This attachment may also be carried out by heat welding.

According to a variant, a sheet of plastic-coated fabric may be stuck to the free glued surface. This sheet may also be attached by welding or sewing.

According to another embodiment, folding is used, namely the porous strip of impregnated support material is surrounded by a film of plastic forming the casing by folding and the folded film can then be glued, welded or stitched to the impregnated porous strip which forms the support material.

According to another embodiment the support material impregnated with the insecticidal substance is surrounded by a coating of natural or synthetic threads which can be braided. This braiding is carried out on a braiding machine in accordance with the rules of the art (in no case is there any weaving) and may help to increase the tensile strength of the collar. Of course, this braiding may also be used in the other embodiments since the mesh of the braid is large enough not to interfere with the migration of the insecticidal substance.

According to yet another variant, the impregnated support material is sandwiched between two sheets of a woven material coated with various plastics, of a width such that, once the edges of the sheets have been pressed down, the support material is completely enveloped by the two sheets which may be stuck, welded or stitched together along their edge.

According to a different variant, orifices are provided in the collar and open out on the coat side, i.e. the side which is supposed to come into contact with the animal's coat. These orifices reach the support material and thus make it easier for the latter to exude the impregnating substance towards the animal's coat.

Thus, the collars to which the invention relates include strips one side of which is partially or totally perforated; this is to say that some of the polymer casing which forms the surface of the strip has been removed, exposing the support material impregnated with the insecticidal solution.

Here, therefore, the physical phenomenon is different since there is no longer any migration by molecule-by-molecule diffusion through a polymer wall but a progressive release by direct contact with the support which is a reservoir of active substance.

These differences therefore require additional precautions and a slightly different approach to the manufacture of the active solutions. In fact, it is essential to avoid using solutions of low viscosity liquids as were used in the first variant of the invention: these liquids would have a tendency to leave the strip too quickly (during the storage period, for example) and make the collar totally ineffective when it is used or, on the other hand, there could be a massive and therefore harmful release of solution onto the animal's body.

Whereas the insectidal solutions in the strips of the first part have viscosities ranging from 50 to 100 centipoise (or values around this range) there is an increase in the viscosity of the solutions in the case of perforated strips; the goal is deemed to have been reached when the viscosity of the liquid is above 500 cps and preferably when it is around 5000 cps, either above or below this level (the viscosity is measured at 20° C. in a viscosimeter with comparative measurements of the rotation couple).

This increase in viscosity is obtained by adding natural or artificial thickeners to the insecticidal mixture (agar-agar, carraghenates, various gums, etc.); some of these thickeners also develop the adhesive qualities of the final mixture to the support material in its mass (formation of a slightly adhesive mixture).

It is certainly possible to apply a readily detachable film to the free surface of the collar, after impregnation, to prevent leakage during storage; this film is applied in the form of a fast-drying varnish (based on casein, for example).

In the case of powdered insecticides, a different method of impregnation and procedure may be envisaged.

The powder is dissolved in a suitable organic solvent (generally the one in which the best solubility is obtained) and this is dispersed in an aqueous phase using an emulsifier. The support material is then impregnated with this mixture and then the solvent or water is evaporated off (by drying in heat, with compressed air, etc.). In this way, the support material is charged in its mass with the powdered insecticide which will be released on wear as a result of the pressure exerted on the collar (mechanical pressure, wear, etc.).

In the accompanying drawings, which are given solely by way of example:

FIGS. 1 to 9 illustrate variants of collars according to the invention,

FIGS. 11 and 12 are an exploded view and a view before use, respectively, of a buckle for the collar according to the invention partially shown in FIG. 3 with various methods of fixing a ring for a leash.

Figure 1:
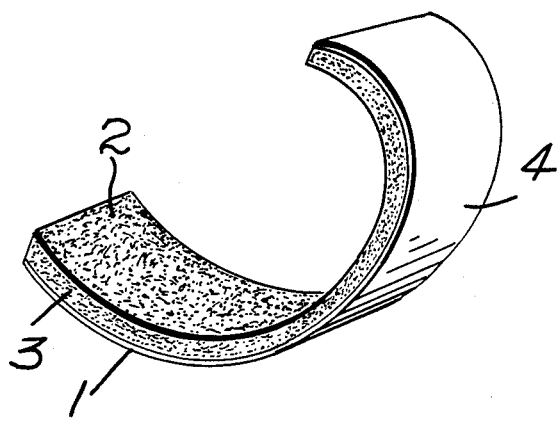

In FIG. 1, a support material 1 in the form of a flexible strap impregnated with an insecticidal substance is covered on its upper surface 2 and on its sides 3 with a fine film of polymer, whilst its surface 4 is free, so that the insecticide can come out of the support material, particularly when the collar is subjected to stresses and vibrations as is the case when it is in place on the animal's neck.

Figure 2:
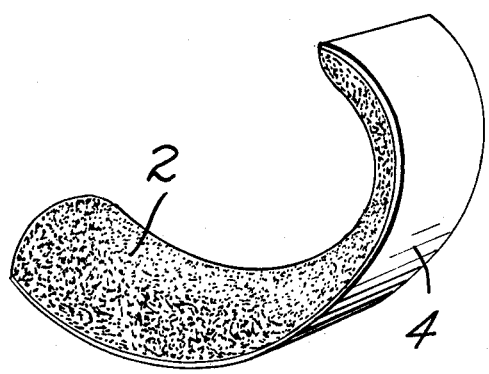

In FIG. 2, the support material in the form of a strap is semi-circular in cross section.

Figure 3:
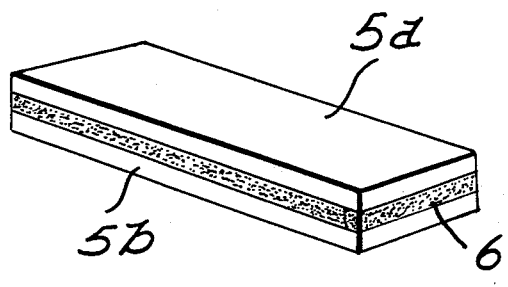

In FIG. 3, two collars 5a, 5b of the type shown in FIG. 1 are assembled, by their free surfaces, by the provision of an intermediate layer of adhesive 6.

Figure 4:
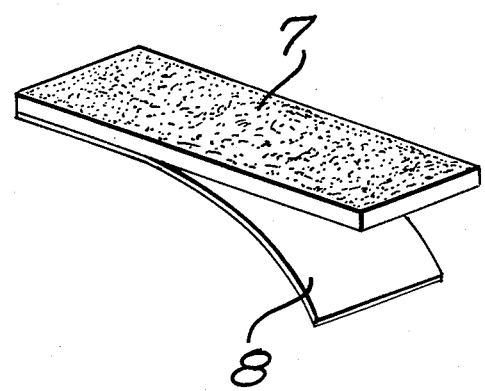

In FIG. 4, an impregnated support material 7 of the type shown in FIG. 1 is covered, on its free surface, with a thin sheet of coating fabric.

Figure 5:
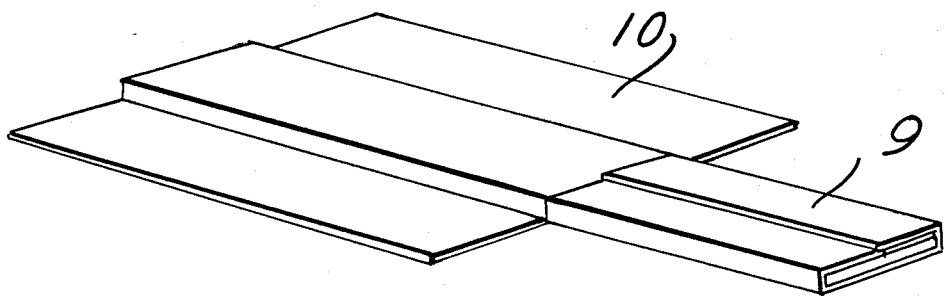

FIG. 5 illustrates a collar obtained by folding. The support material 9, impregnated with insecticidal substance, is placed on a wider sheet 10 which is then folded over the support material 9.

FIG. 6 shows two different materials 11 impregnated with insecticidal substance and surrounded by a braid 12.

FIGS. 7 and 11 illustrate another embodiment of the invention wherein the support material 13 impregnated with insecticidal substance is placed on a sheet 14 which is slightly wider than the support material 13, whilst another sheet 15 is applied on top and is connected, as shown in FIG. 8, to the sheet 14 by its edges. In FIG. 9, holes 15 reach the support material 17.

In its final form, the collar (FIG. 13) takes the form of a flexible strap 18 of various colours the surface of which has various types of encased reliefs. This strap 18 is accompanied by a buckle 19 separately comprising a closure system designed to retain the two ends of the strap together. This system is made up of an intermediate plate 20 fitted on either side with tabs 21, 22 for assembly by rotation of plates 23, 24 having a toothed front edge 25 (FIGS. 11 and 12).

Positioning of the collar around the neck of the animals to be treated (FIGS. 11 and 12) is very easy: one end is inserted in the buckle 19 to block it, then the strap 18 is passed around the animal's neck so that the second end can be pressed into the same buckle 19.

Furthermore, a ring 26 is either fixed to the buckle or threaded directly onto the strap so that a leash can be attached to the collar. The latter is thus used as a restraining collar since the buckle is designed to present maximum resistance to being opened and torn off.

The following Examples illustrate the invention. In these Examples, all the formulations of insecticidal mixture may also comprise an emulsifying agent or a stabiliser.

EXAMPLE 1

A parallelepipedal strip of bonded cellulose 1.5 cm wide and 2 mm thick is cut into sections 70 cm long (intended to become collars for large dogs), after being impregnated with an insecticidal solution. To do this, it is immersed, by means of a pulley system, in a bath containing the following insecticidal mixture:
sumithrine (insecticide) 0.1 to 1%
piperonyl butoxide (synergist) 1 to 5%
dioctyl phthalate q.s. ad 100%.

The 70 cm sections are placed on 0.1 mm thick strips of woven material coated with polyurethane, previously glued (latex gum) and slightly larger than them (in width and length). In a second step, the combined strip of woven material and section of bonded cellulose is covered with another strip of woven fabric of the same dimensions. The whole is finally compressed so that adhesive bonding takes place.

EXAMPLE 2

A parallelepipedal strip of bonded cellulose 1.5 cm wide and 1 mm thick is impregnated with an insecticidal solution in the same way as the strip in Example 1. The insecticidal mixture is as follows:
permethrine (insecticide) 0.1 to 1% (synergist)—S 421 (octachlorodipropylether) 1 to 5%
vaseline oil q.s. ad 100%.

The strip is then placed on a sheet of polyethylene 0.2 mm thick having a width such that it can be "folded" around the impregnated strip. A local weld along the polyethylene sheet enables the two edges to be stuck together. The now folded strip is then cut, whilst hot, into 35 cm sections intended to be made into collars for cats and small dogs.

EXAMPLE 3

A parallelepipedal strip 1.5 cm wide and less than 1 mm thick consisting of braided cotton thread is impregnated with an insecticidal solution in the same way as in Example 1. This solution is as follows:
permethrine (insecticide) 0.1 to 1%
piperonyl butoxide (synergist) 1 to 5%
groundnut oil q.s. ad 100%.

This strip is cut into sections 35 cm long (intended to be made into collars for cats and small dogs) which are placed on sheets of woven material coated with polyvinyl chloride, previously gummed and slightly larger in size (both width and length). The sheets are 0.8 mm thick. In a second step, the whole is covered with another sheet of woven fabric of the same thickness and dimensions. The whole is pressed so that bonding takes place.

EXAMPLE 4

A cylindrical strip of braided cotton thread 0.5 cm in diameter is cut into sections 70 cm long (collars for big dogs) which are impregnated drop by drop with the following insecticidal solution:
sumithrine (insecticide) 0.1 to 1%
sesamex (synergist) 1 to 5%
soya oil q.s. ad 100%.

These sections are placed between two sheets of woven fabric 0.8 mm thick coated with polyvinyl chloride and previously gummed (and larger in width). The whole is then pressed to ensure that bonding takes place.

EXAMPLE 5

A parallelepipedal strip of bonded cellulose 1.5 cm wide and 2 mm thick is covered with a sheath of polyamide, polyester and nylon threads, acrylic fibres, etc., which is braided around it by means of a braiding machine. The braided strip is then impregnated by soaking (see Example 1) in the following insecticidal solution:
neopynamine (insecticidal) 0.1 to 1%
piperonyl butoxide (synergist) 1 to 5%
ethyldiglycol q.s. ad 100%.

This strip is then cut into sections 70 cm long and used as it is.

EXAMPLE 6

The same procedure is used as in Example 5, but the strip is then "hemmed in" by means of a polyethylene sheet 2 mm thick which is welded edge to edge to give a total seal.

EXAMPLE 7

A parallelepipedal strip of bonded cellulose already coated on three of its surfaces (see Example 1) with a layer of PVC (1.5 cm wide, 2.5 mm thick) is impregnated by a drop by drop system with the following insecticidal solution:
diazinon (insecticide) 1 to 5%
dioctyl phthalate q.s. ad 100%.

This strip is then stuck, by its non-coated surface, to a sheet of PVC-coated woven material of the same width and 0.8 mm thick. The whole is then cut into 70 cm sections (intended for use as collars for big dogs).

EXAMPLE 8

A parallelepipedal strip of bonded cellulose already coated on three of its sides with a PVC coating (1.5 cm wide, 1 mm thick) is impregnated by a drop by drop system with the following insecticidal solution:
diazinon (insecticide) 1 to 5%
dioctyl phthalate q.s. ad 100%.

This loop is then stuck, by its non-coated surface, to a twin strip which has already been impregnated. The whole is then cut into 35 cm sections (intended to become collars for cats and small dogs).

EXAMPLE 9

A cylindrical strip formed by braided wool (0.5 cm in diameter) is impregnated by soaking in a bath (see Example 1) containing the following insecticidal solution:
sumithrine (insecticide) 0.1 to 1%
sesamex (synergist) 1 to 5%
dioctyl phthalate q.s. ad 100%.

This strip, cut into sections 35 cm long, is stuck between two sheets of PVC-coated fabric 0.8 mm thick. The whole is pressed to perfect the bonding.

EXAMPLE 10

A strip of felt which is parallelepipedal in shape and pre-coated on three of its surfaces with a layer of PVC 0.8 mm thick is impregnated, by a drop by drop system, with the following insecticidal solution:
neopynamine (insecticide) 0.1 to 1%
S421 (octachlorodipropylether (synergist)) 1 to 5%
soya oil q.s. ad 100%.

A strip of the same type as the previous strip is pierced with holes (of various numbers, shape and sizes) and is impregnated in the same way. The two strips are then stuck together by their non-plasticised sides (latex gum) then cut into sections 70 cm long (collars for big dogs).

EXAMPLE 11

A strip of bonded cellulose which is parallelepipedal in shape and pre-coated on three of its sides with a PVC coating 0.8 mm thick is impregnated, by a drop by drop system, with the following insecticidal solution:
permethrine (insecticide) 0.1 to 1%
Nonarox 1030 NP (emulsifier) 0.5 to 10%
water q.s. ad 100%.
(wherein the insecticide is totally dissolved in the emulsifier before any water is added).

After evaporation of the water by passing it through a strong current of warm compressed air, the strip is cut into sections 35 cm long (collars for cats and small dogs) and used as it is.

IMPREGNATION LEVELS

The following Tables summarise the impregnation levels of the different materials which are used as the support materials containing the active insecticidal substance.

| 70 cm collars Example No. | Impregnation level (g/cm) | Weight of active substance (g) |
|---|---|---|
| 1 | 0.20–0.30 | 14.0–21.0 |
| 4 | 0.27–0.40 | 18.9–28.0 |
| 5 | 0.27–0.33 | 18.9–23.1 |
| 6 | 0.27–0.33 | 18.9–23.1 |
| 7 | 0.20–0.30 | 14.0–21.0 |
| 10 | 0.29–0.38 | 20.3–26.6 |

| 35 cm collars Example No. | Impregnation level (g/cm) | Weight of active substance (g) |
|---|---|---|
| 2 | 0.07–0.17 | 2.45–5.95 |
| 3 | 0.10–0.17 | 3.50–5.95 |
| 8 | 0.06–0.15 | 2.10–5.25 |
| 9 | 0.11–0.19 | 3.85–6.65 |

The impregnation levels are given in units of weight of active substance per unit of length of the collar.

EXAMPLE 12

The following Example, intended to illustrate the permeability of the outer casing, was carried out on an experimental collar 70 cm long consisting of a support material of bonded cellulose covered with a casing of fabric coated with polyvinyl chloride (PVC) 0.8 mm thick. The insecticidal solution contained in this experimental collar was made up of:
sumithrine (insecticide) 0.1 to 1%
piperonyl butoxide (synergist) 1 to 5%
dioctyl phthalate q.s. ad 100%.

In this way, a weight of active substance of 17.5 g is obtained. A number of collars of this type were subjected to severe conditions of use and in this way it was possible to determine, by measurement, the quantities of insecticidal solution which migrated to the surface of the outer casing.

The method of measurement comprises a number of steps and is carried out on a fragment of collar of known length or, for more accuracy, on the entire collar. The following procedure is used:

dissolving the outer casing and its content of insecticidal solution by means of a known solvent for the polymer used (for example: tetrahydrofuran for PVC).

dissolving the inner cellulose support and its content of insecticidal solution by means of a suitable solvent.

Reprecipitation of the polymer and the support and filtration to eliminate them so as to obtain a liquid containing only the insecticidal solution and the various solvents used.

Proper titration of the insecticide by gas chromatography using an internal standard.

The following Table gives the figures for permeability per unit of weight per day (g/day).

| 0 | 1 | 2–4 | 5–15 | 19–24 | 25–27 | 28–29 | 30 | 31 | 32–34 | 35–38 |
|---|---|---|---|---|---|---|---|---|---|---|
| 0.110 | 0.106 | 0.100 | 0.099 | 0.098 | 0.096 | 0.094 | 0.092 | 0.090 | 0.088 | 0.086 |

| 19–44 | 45–53 | 54–61 | 62–73 | 74–88 | 89–102 | 103–116 |
|---|---|---|---|---|---|---|
| 0.085 | 0.084 | 0.083 | 0.082 | 0.081 | 0.080 | 0.079 |

| 117–124 | 125–129 | 130–131 | 132 | days |
|---|---|---|---|---|
| 0.078 | 0.076 | 0.074 | 0.071 | permeability |

Figure 10:
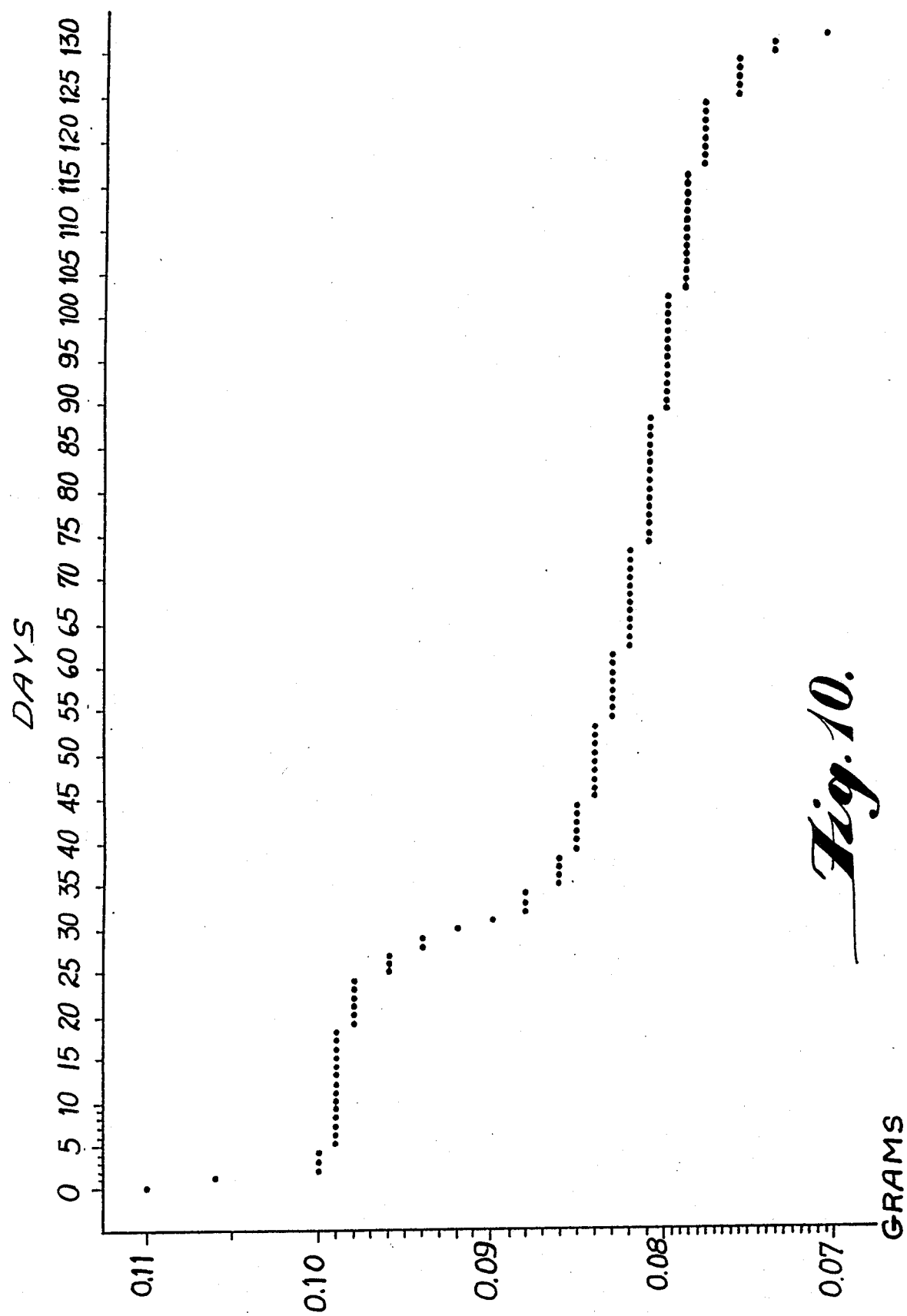
FIG. 10 is a curve illustrating the permeability of a collar according to the invention to an insecticidal substance as a function of time.

The curve which corresponds to this Table (FIG. 10) shows that, after 130 days, the doses of active solution leaving the collar have reduced significantly (although they had remained within suitable limits throughout this period). Thus, although the solution is still coming out, the collar is deemed to be becoming less and less effective and consequently its period of use is about 130 days.

EXAMPLE 13

Using a drop by drop system, a parallelepipedal strip (pre-coated on three of its sides with a layer of polyvinyl chloride), 10 mm wide and 2 mm thick (65 or 35 cm long), is impregnated with the following solution:
methoprene: 0.1%
dioctyl phthalate q.s. ad 100% (co-migrant)

EXAMPLE 14

Example 13 is repeated, except that the solution for impregnation is as follows:
methoprene: 0.3%
permethrine: 0.1 to 1% (insecticide)
piperonylbutoxide: 1 to 5% (synergist)
dioctyl phthalate: q.s. ad 100% (co-migrant).

The collars in Examples 13 and 14 are subjected to the same tests as those described hereinbefore. Excellent results are obtained.

I claim:
1. A ready-for-use insecticidal collar for animals in strip form comprising
   (a) an inner element comprising an absorbent textile material impregnated with a liquid insecticidal composition comprising a liquid insecticidal pyrethroid or pyrethrin and a hygroscopic substance selected from the group consisting of calcium chloride, magnesium chloride, lecithin, choline and salts thereof, said hygroscopic substance being present in an amount of about 1 to 10 parts by weight per 100 parts by weight of said liquid insecticidal composition, and
   (b) a polyvinyl chloride casing surrounding said inner element, at least a portion of said casing being permeable to said liquid insecticidal composition.
2. The collar of claim 1 wherein said liquid insecticidal composition also contains a plasticizer for said polyvinyl chloride casing in an amount ranging from approximately 5 to 95 parts per 100 parts by weight of the total weight of said insecticidal composition.
3. The collar of claim 1 wherein said liquid insecticidal pyrethroid or pyrethrin has a vapor pressure of the order of $10^{-7}$ mm of mercury at 20° C.
4. The collar of claim 1 wherein said polyvinyl chloride casing has a thickness ranging from about 0.1 to 0.8 mm.
5. The collar of claim 1 wherein said casing contains orifices through which said liquid insecticidal composition is released, said liquid insecticidal composition having a viscosity about 500 cps at 20° C.

* * * * *